United States Patent [19]
Meron

[11] Patent Number: 5,950,564
[45] Date of Patent: Sep. 14, 1999

[54] HEN NESTING APPARATUS AND BROOD CONTROL METHOD

[75] Inventor: Uri Meron, Kibbutz Givat Haim Ichud, Israel

[73] Assignee: M.G.H. Agricultural Cooperative Society Ltd., Givat Haim Ichud, Israel

[21] Appl. No.: 08/952,315

[22] PCT Filed: May 8, 1996

[86] PCT No.: PCT/US96/06441

§ 371 Date: Feb. 19, 1998

§ 102(e) Date: Feb. 19, 1998

[87] PCT Pub. No.: WO96/35327

PCT Pub. Date: Nov. 14, 1996

[30] Foreign Application Priority Data

May 9, 1995 [IL] Israel ........................................ 113675

[51] Int. Cl.⁶ ........................... A01K 31/17; A01K 45/00
[52] U.S. Cl. ........................................ 119/332; 119/337
[58] Field of Search ................................... 119/335, 326, 119/327, 330, 331, 333, 334, 336, 337, 840, 841, 842, 719

[56] References Cited

U.S. PATENT DOCUMENTS

| | | |
|---|---|---|
| 1,481,684 | 1/1924 | Butterfield . |
| 2,108,287 | 2/1938 | Kellum ........................................ 119/47 |
| 2,204,284 | 6/1940 | Sifakas . |
| 4,188,911 | 2/1980 | Rafaely ........................................ 119/48 |
| 4,354,098 | 10/1982 | Peppler ........................................ 235/98 |
| 4,381,732 | 5/1983 | Huisinga ........................................ 119/45 |
| 4,512,096 | 4/1985 | Heidecker ........................................ 40/304 |
| 4,516,532 | 5/1985 | Rafaeli ........................................ 119/48 |
| 4,597,495 | 7/1986 | Knosby ........................................ 209/3.3 |
| 4,798,175 | 1/1989 | Townsend et al. ........................... 119/155 |
| 4,889,076 | 12/1989 | Cohen ........................................ 119/50 |
| 5,002,016 | 3/1991 | de Vrieze ........................................ 119/48 |
| 5,125,362 | 6/1992 | Erickson et al. ........................... 119/45.1 |
| 5,143,021 | 9/1992 | Shaley ........................................ 119/50 |
| 5,222,459 | 6/1993 | Johnson ........................................ 119/45.3 |
| 5,438,960 | 8/1995 | Roosenboom ........................... 119/713 |
| 5,628,284 | 5/1997 | Sheen et al. ........................... 119/840 |

Primary Examiner—Michael J. Carone
Assistant Examiner—Yvonne R. Abbott
Attorney, Agent, or Firm—Mark M. Friedman

[57] ABSTRACT

Nesting apparatus (2) for hens includes a line of nesting cages (2), and an ejector member (4) in each cage (2), individually actuatable independently of the ejector members (4) in the other cages (2) to eject a hen from the respective cage (2) upon the existence of one or more specified conditions, such as the laying of an egg in the cage (2), the occupation of the cage (2) by the respective hen a predetermined length of time, etc. The hens carry transponders (15) which may be interrogated by a reader (18) movable along the line of cages (2) to identify the hens and to keep track of their activities.

17 Claims, 16 Drawing Sheets

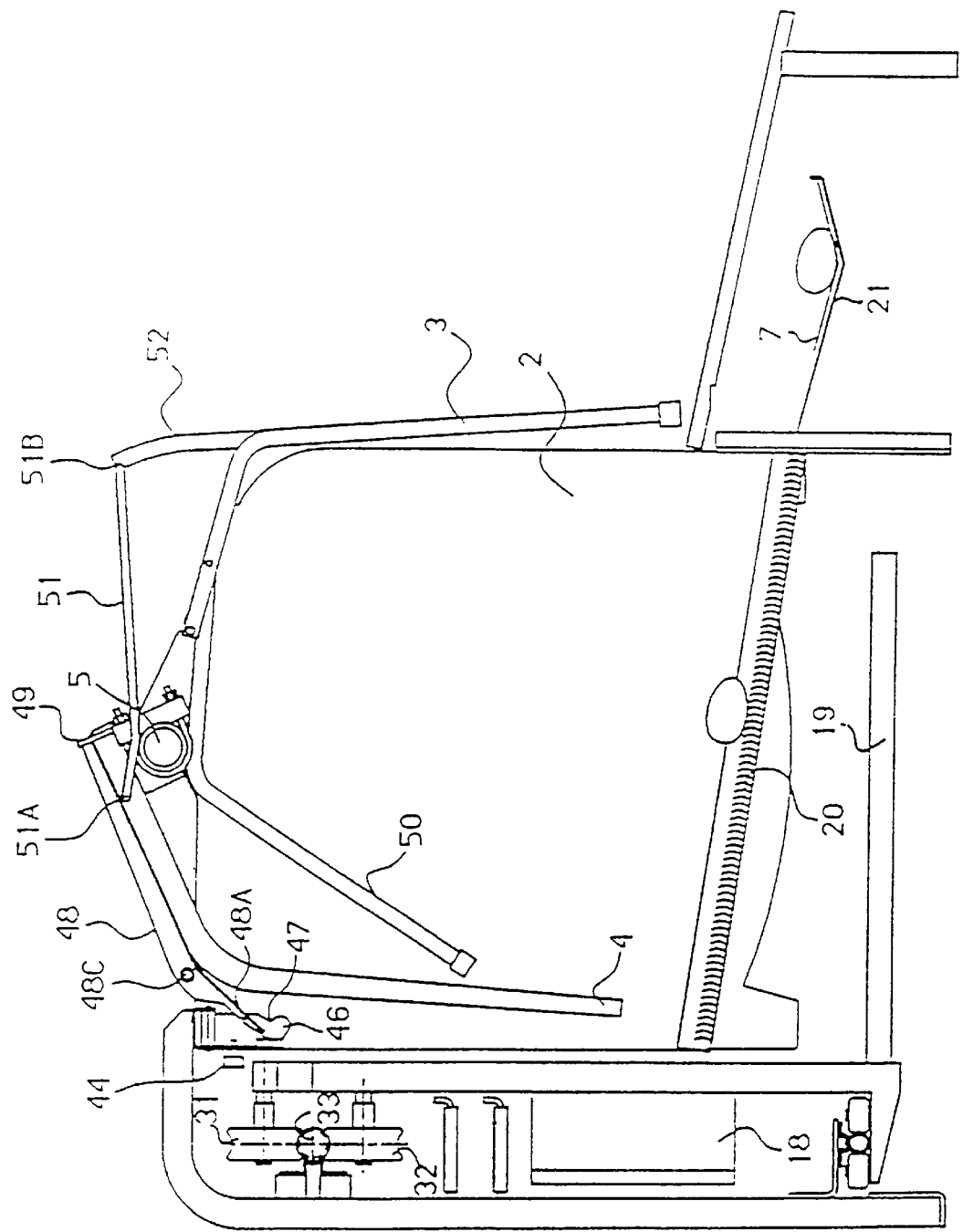

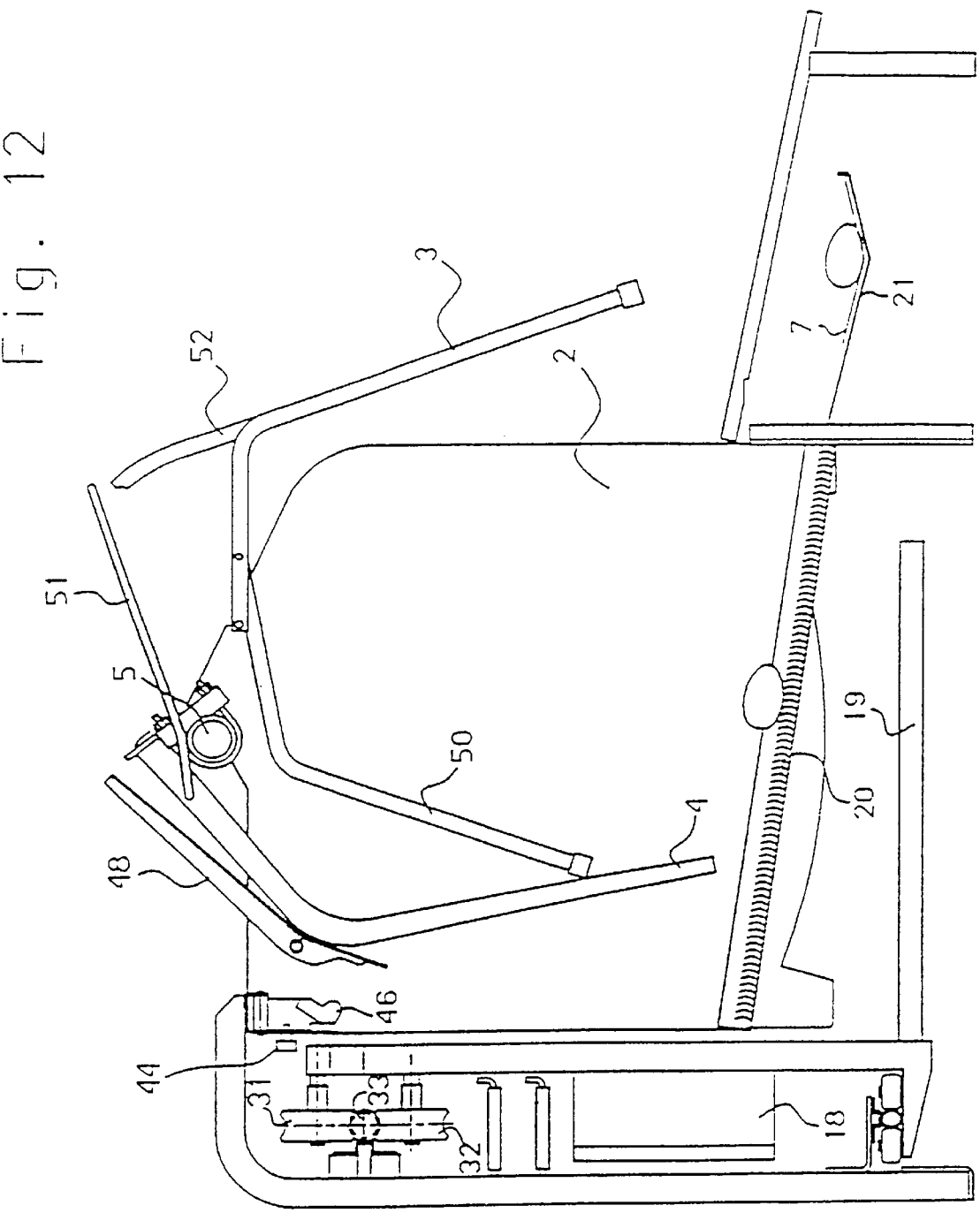

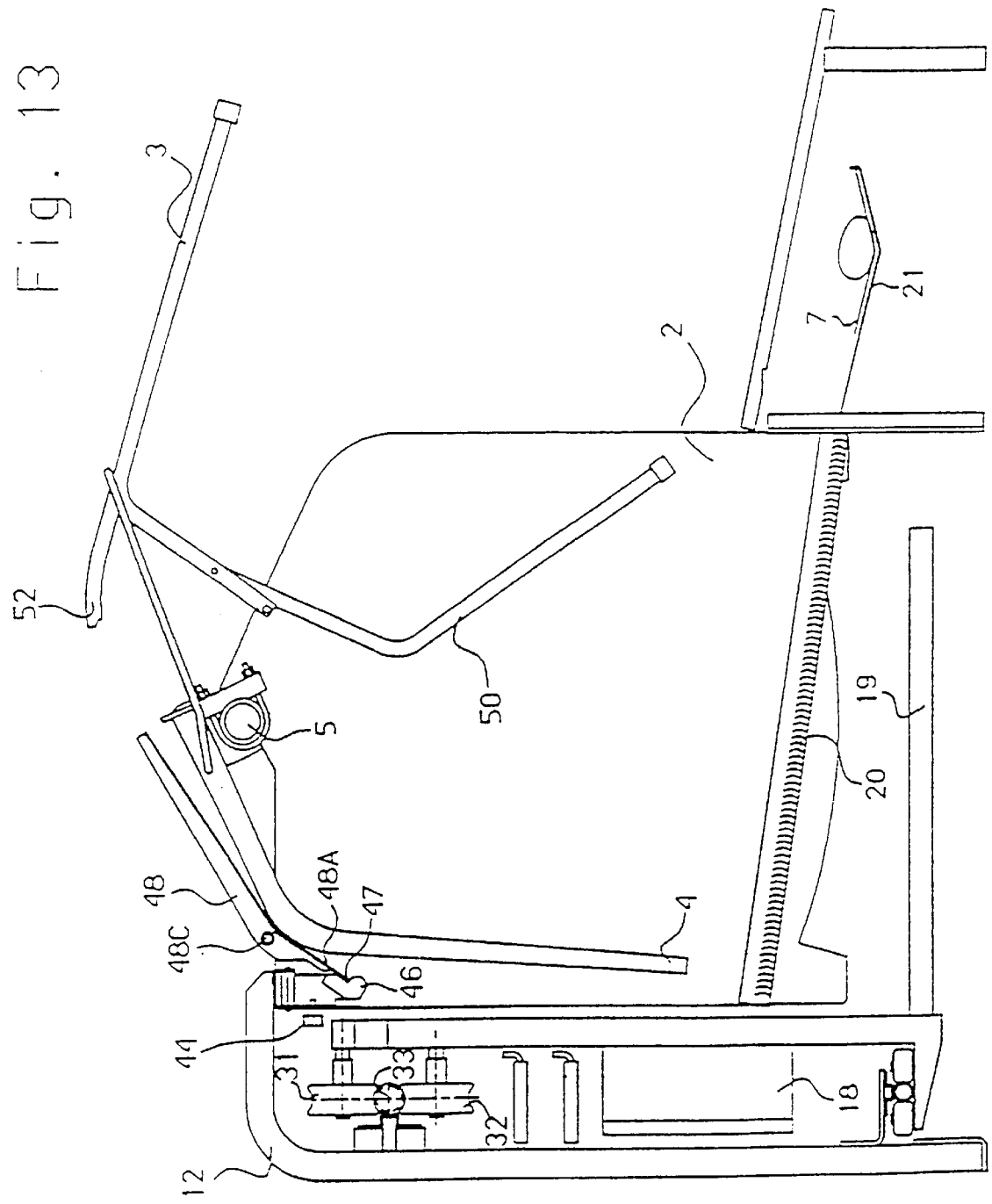

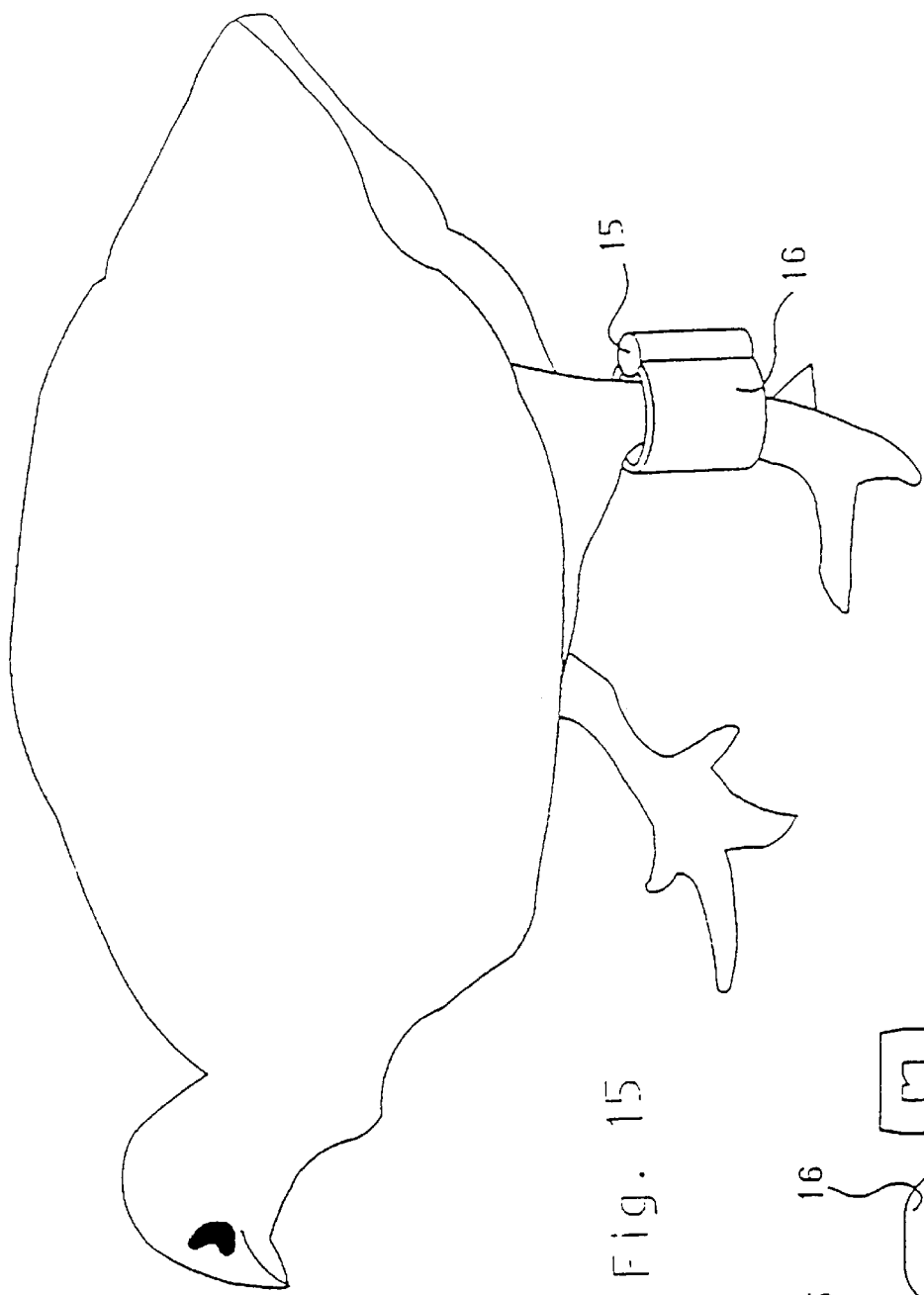
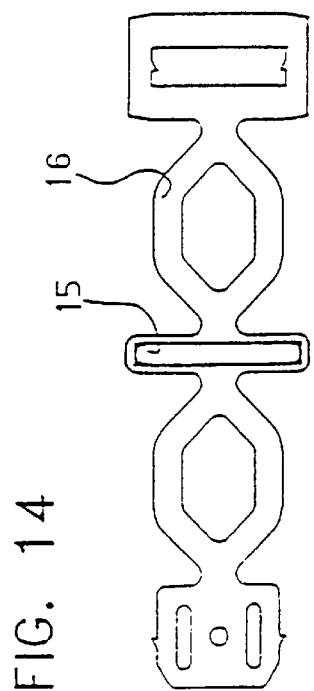
Fig. 15
FIG. 14

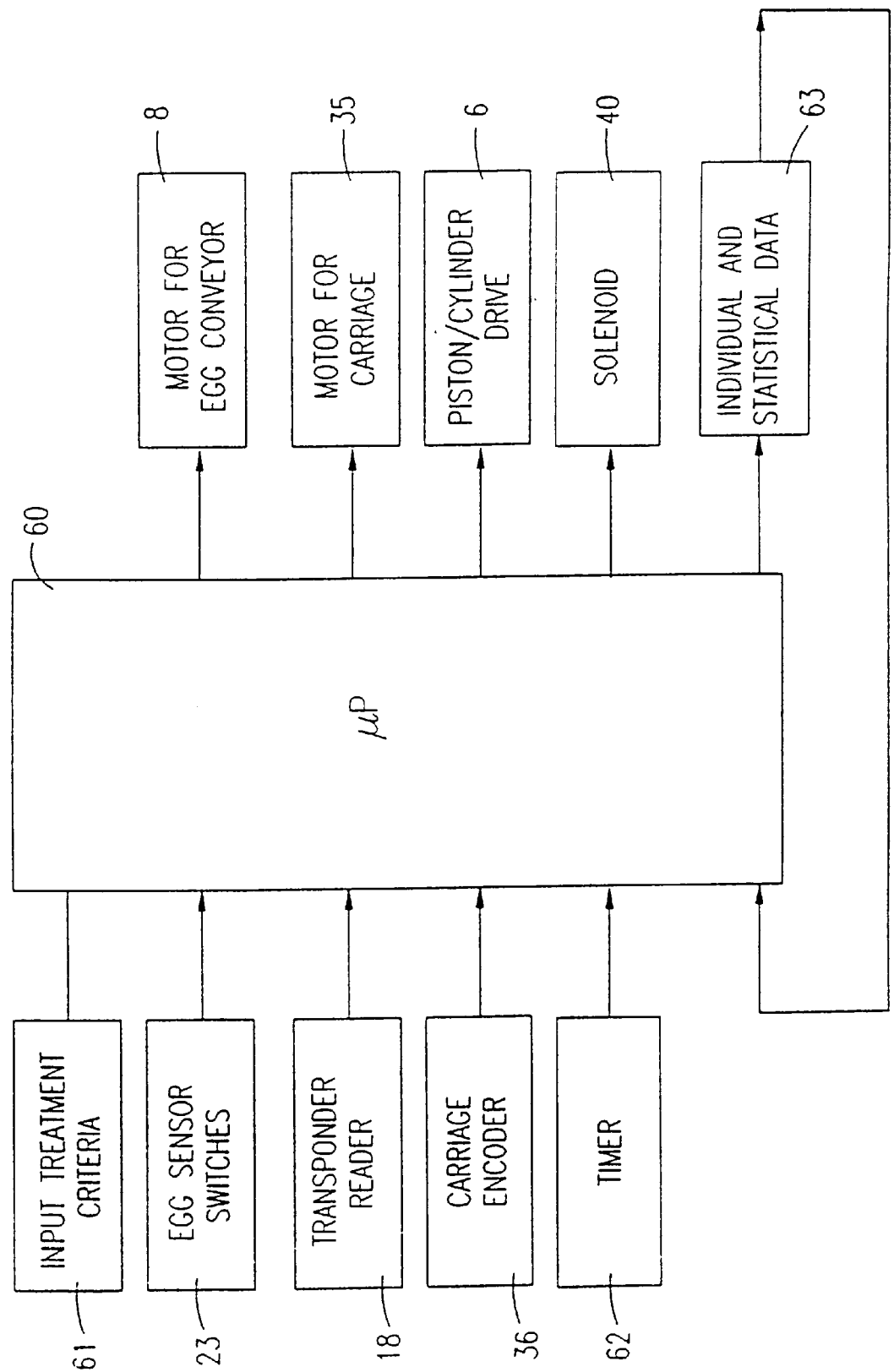

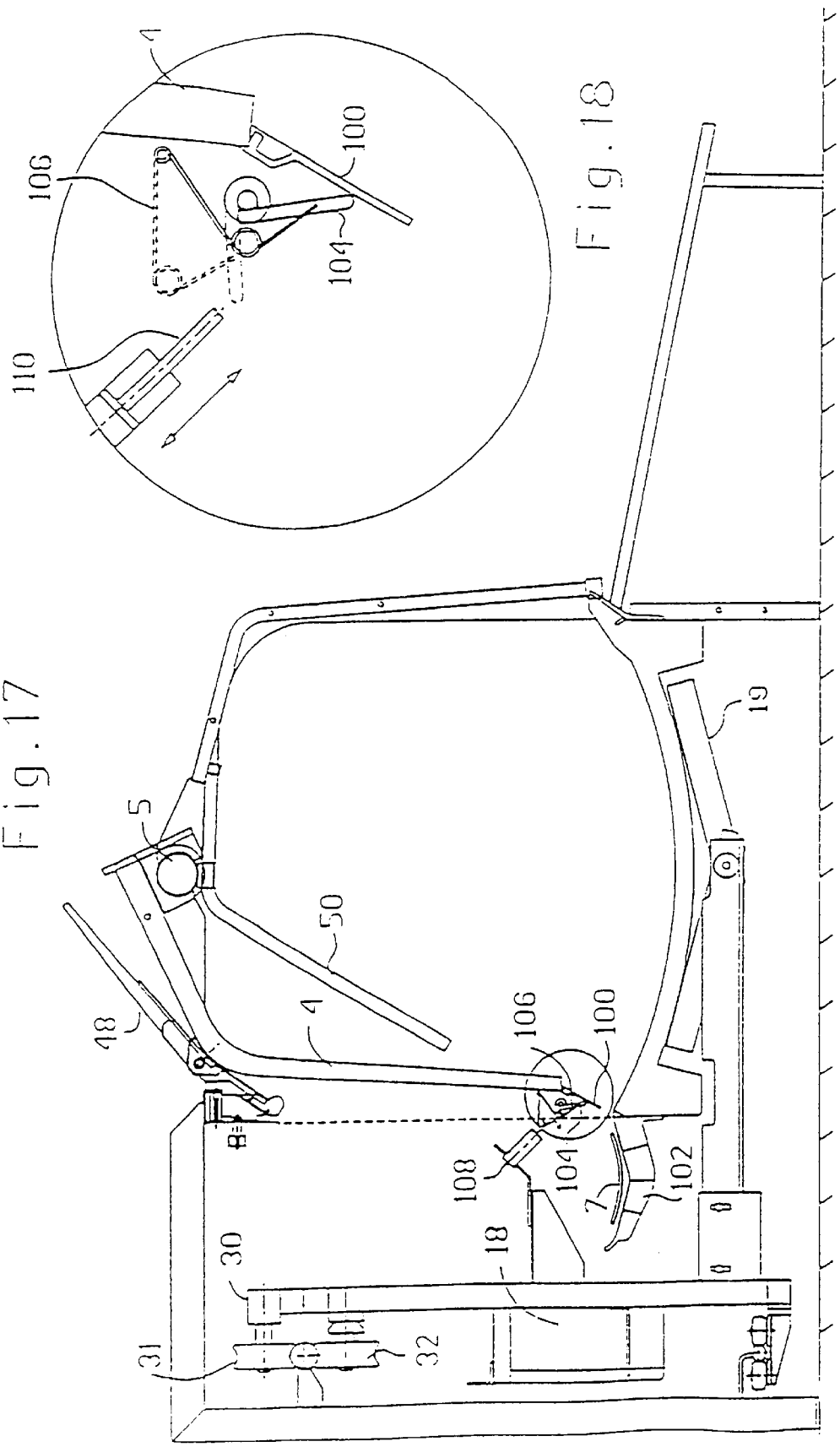

HEN NESTING APPARATUS AND BROOD CONTROL METHOD

FIELD AND BACKGROUND OF THE INVENTION

The present invention relates to hen nesting apparatus, and also to a method for utilizing such apparatus for broody (nesting) control and other controls of hens according to criteria applicable to individual hens. The invention is particularly (but not exclusively) useful with respect to turkey hens and is therefore described below in connection with this application.

Nesting apparatus is known, e,g., as described in Israel Patent 52211 (U.S. Pat. No. 4,188,911), for turkey hens which include a line of nesting cages and an ejector assembly in each cage actuatable to eject a hen from the cage. In these known constructions, the ejector assemblies of all the cages are actuated at the same times according to fixed intervals (e.g., at 45-minute intervals). Such constructions therefore do not maximize the use of the nesting cages. Moreover, the current methods of broody control generally deal with the flocks as a whole, and therefore do not maximize the egg output of the individual hens within a flock.

OBJECTS AND BRIEF SUMMARY OF THE INVENTION

An object of the present invention is to provide nesting apparatus having advantages in the above respects.

Another object of the invention is to provide nesting apparatus, and also a method of utilizing such apparatus, for controlling the brooding of a flock of hens in order to maximize their egg output.

According to a one aspect of the present invention, there is provided nesting apparatus for hens, comprising: a line of nesting cages; and an ejector system including an ejector member in each cage actuatable to eject a hen therefrom; the ejector member in each cage including an individual actuator enabling the ejector member to be individually actuated independently of the ejector members in the other cages to eject a hen from the respective cage.

According to another aspect of the invention, there is provided nesting apparatus for hens, comprising: a transponder attachable to each hen effective, upon being interrogated by an antenna, to transmit a signal identifying the respective hen; a line of nesting cages; a carriage movable along a path traversing the line of cages; a carriage drive for driving the carriage; an encoder for continuously indicating the instantaneous position of the carriage with respect to the cages traversed by the carriage; an antenna carried by the carriage for interrogating the transponders carried by the hens in the cages as the cages are traversed by the carriage; and a receiver for receiving the signals from the transponder and for thereby identifying the hens in the cages as traversed by the carriage.

According to a still further aspect of the invention, there is provided a method of controlling a flock of hens, comprising: providing the flock of hens with a line of nesting cages each including an ejector member actuatable to eject a hen therefrom; sensing the occurrence of a specified condition with respect to individual hens; and controlling the ejector assembly of a nesting cage occupied by a hen in response to sensing the occurrence of the specified condition with respect to the respective hen. There may be one or more specified conditions, including the laying of an egg by the same hen during a predetermined time period (e.g., 24 hours), the entry of the hen a predetermined number of times in a cage within a predetermined time period, the time spent by the hen in a cage, the time of day the respective hen entered the cage, and/or the time of day when the hen laid the previous egg.

According to a still further aspect of the invention, there is provided a method of controlling a flock of hens comprising: attaching to each hen a transponder effective, upon being interrogated, to transmit signals identifying the respective hen; moving an antenna along a line of the nesting cages for interrogating the transponders carried by the hens in the cages; receiving identification signals from the transponders as they are interrogated by the antenna; and determining the instantaneous position of an antenna at the time a signal is received from an interrogated transponder to thereby identify the hen in each cage occupied by a hen.

As will be described more particularly below, the apparatus and method of the present invention enable each hen of a flock to be individually identified and its activity individually tracked, and also enable each cage to be individually controlled to produce a maximum egg output from the hens.

Further features and advantages of the invention will be apparent from the description below.

BRIEF DESCRIPTION OF THE DRAWINGS

The invention is herein described, by way of example only, with reference to the accompanying drawings, wherein:

FIGS. 10–13, respectively, are side elevational views illustrating different phases of the operation of the ejector assembly and its actuator system;

FIG. 14 illustrates the transponder;

FIG. 15 illustrates the manner of attachment of the transponder to a hen;

FIG. 16 is a block diagram schematically illustrating the overall electrical control system;

FIG. 17 is a side elevational view, corresponding to that of FIG. 10, but illustrating a modification in the construction of the apparatus; and FIG. 18 is an enlarged view of the egg flagging arrangement included in the apparatus of FIG. 17.

DESCRIPTION OF A PREFERRED EMBODIMENT

Overall Construction

Figure 1:
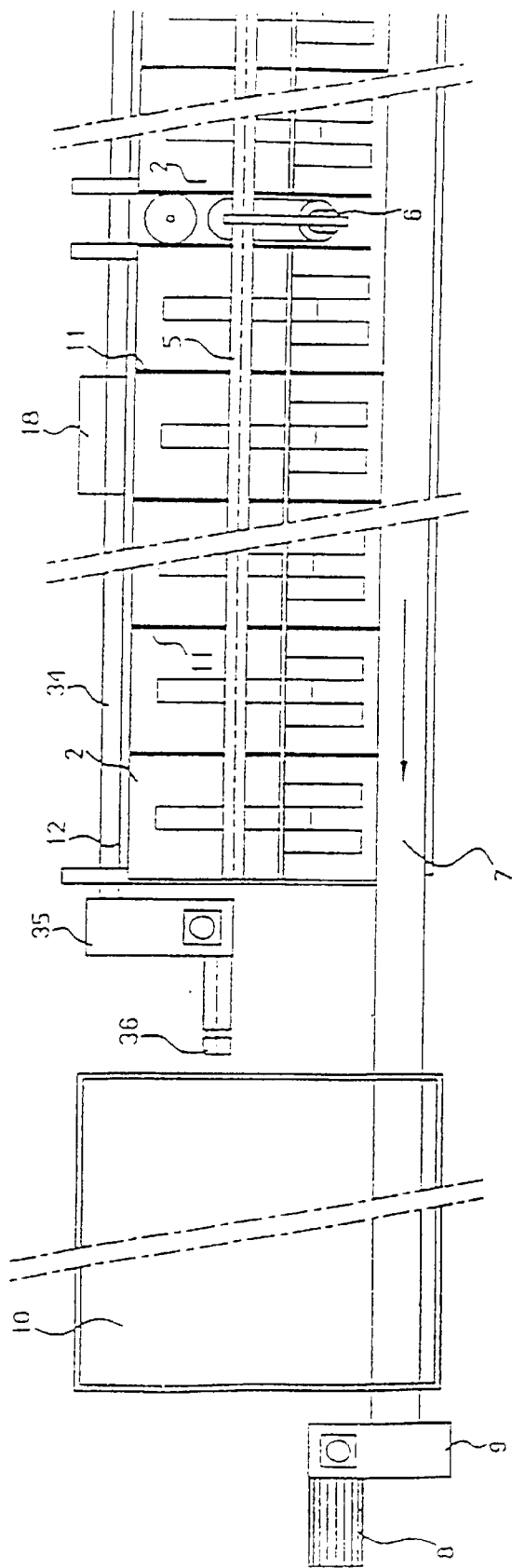
FIG. 1 is a top plan view illustrating one form of nesting apparatus constructed in accordance with the present invention.

The nesting apparatus shown in FIGS. 1–16 illustrates a preferred embodiment of the invention to enable the brooding of a flock of hens, particularly turkey hens, to be efficiently managed in order to produce a maximum yield of eggs. For this purpose, the apparatus includes a line of nesting cages 2 for the hens to shelter them from disturbances at the time of nesting. As shown particularly in FIGS. 10–13, each cage includes a trap 3 which is normally open and automatically closes when a hen enters the cage, and an ejector member in the form of a bar 4 which is actuated in order to gently eject the hen from the cage so as to permit the cage to be used for other hens. All the ejector bars 4 in the line of cages 2 are actuated by a common drive shaft 5 which is rotated in one direction by the forward movement of a pneumatic piston-cylinder drive 6 (FIG. 1), and rotated in the return direction by the return movement of the piston-cylinder drive.

As shown in FIG. 1, the eggs are collected from all the cages 2 by a conveyor belt 7 which extends along one side of the line of nesting cages 2. The conveyor belt 7 is driven by a motor 8 carried by a base 9 at one end of the apparatus so that the conveyor belt traverses the line of cages 2 in order to receive the eggs and to convey them to a collection table 10. The cages 2 are defined by a plurality of partition plates 11 mounted to a frame structure 12. The drive shaft 5 is rotatably supported by the frame structure to overlie the upper ends of all the cages 2.

The nesting apparatus, insofar as described above, is well known, as shown for example in the above-cited patent, and is in wide commercial use. Further details of the construction and operation of such a known nesting apparatus are therefore not set forth herein.

The nesting apparatus illustrated in the drawings includes a number of novel features over the known apparatus to enable flocks of hens to be more efficiently managed in order to produce a maximum egg yield.

One important feature of the illustrated apparatus is that, whereas in the previously known apparatus the ejector members for all the cages were actuated at the same time, in the apparatus illustrated herein, and to be described more particularly below, the ejector member of each cage is individually controlled to enable the ejector member of a particular cage to be individually actuated independently of those of the other cages when an egg has been laid in the respective cage, and/or when another specified condition with respect to a particular hen has occurred.

Another important feature is that the illustrated apparatus enables all the movement of the hens to be monitored, particularly when in one of the nesting cages, to enable records to be maintained of the number of eggs laid by any particular hen. For this purpose, each hen is provided with a transponder, generally designated 15 (FIGS. 14, 15), attached to a retaining band 16 applied to a leg of the hen. Each transponder includes an identification of the respective hen and cooperates with a reader 18 (e.g., FIG. 10) carrying an antenna 19 which traverses the line of nesting cages in close proximity to the transponders 15 of the hens within the cages. The reader 18 interrogates the transponders in sequence by transmitting a power burst via an antenna. The power burst charges each transponder and enables it to transmit a return signal that carries the hen identification and/or other data stored in it for the respective hen.

An example of a transponder/reader system that may be used is that supplied by Texas Instruments under the trademark "TIRIS"; it is based on a low-frequency FM transmission techniques.

The Egg Sensors

As shown particularly in FIGS. 10–13, the bottom 20 of each cage 2 is inclined downwardly towards the egg conveyor 7 so that any egg laid in the respective cage moves by gravity onto the conveyor 7. The egg conveyor 7 is supported by a frame member 21 below the respective end of the cage bottom wall 20.

Figure 2:
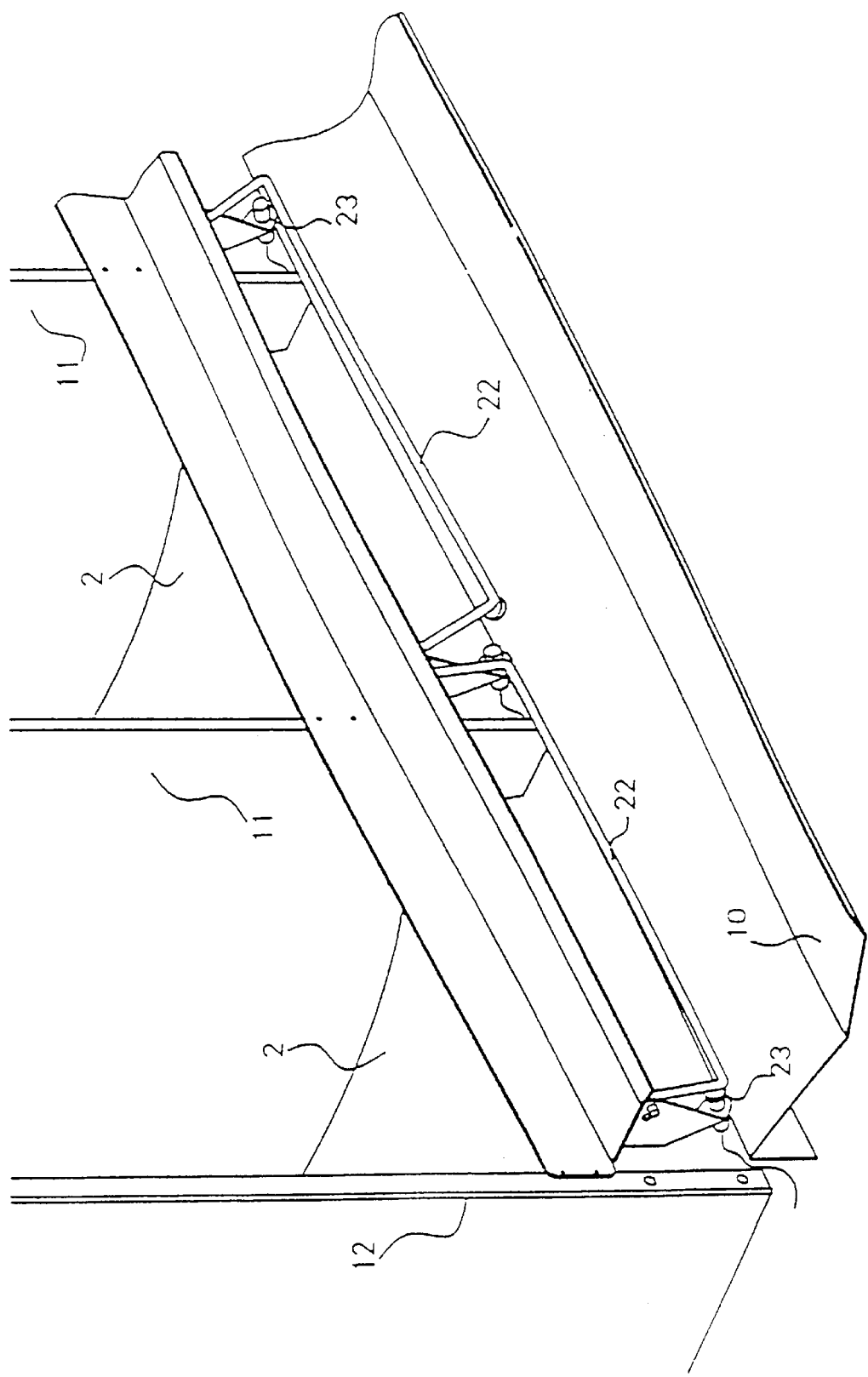
FIG. 2 is an enlarged perspective view of a portion of the apparatus of FIG. 1 from the egg conveyor side of the apparatus.

As shown in FIG. 2, an egg sensor in the form of a bail-shaped member 22 is pivotally mounted across the respective end of each cage, adjacent to the egg conveyor 7 so that this member is engaged and pivotted by an egg moving by gravity from the cage bottom wall 20 onto the egg conveyor. When a bail 22 is so pivotted by an egg moving onto the conveyor belt 7, it actuates an electrical switch 23, which thereby provides a signal that an egg has been laid in the respective cage.

The Ejector Assemblies and Their Actuation System

Each cage is provided with an ejector assembly, which includes the previously-mentioned ejector bar 4, actuated when the egg sensor (electrical switch 23 actuated by bail 22) has sensed that a hen has laid an egg in the respective cage and/or when another specified condition with respect to a particular hen has occurred. In the embodiment of the invention described in FIGS. 1–16 for purposes of example, when the laying of an egg in a particular cage has been sensed, the ejector actuator system actuates the ejector assembly of the respective cage to eject the hen then in the cage.

Figure 3:
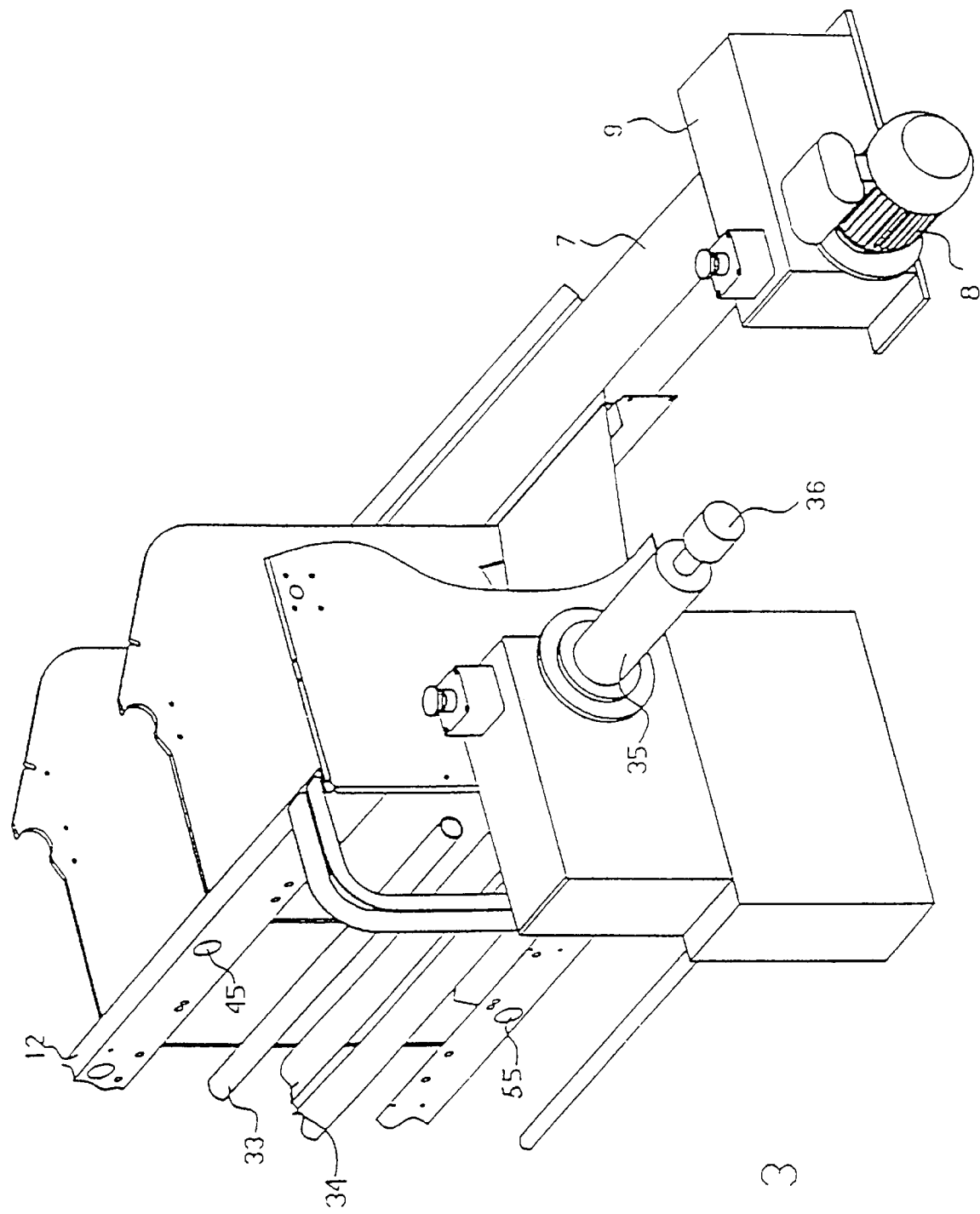
FIG. 3 is a perspective view of a portion of the apparatus of FIG. 1 from the side opposite to that of the egg conveyor.
Figure 4:
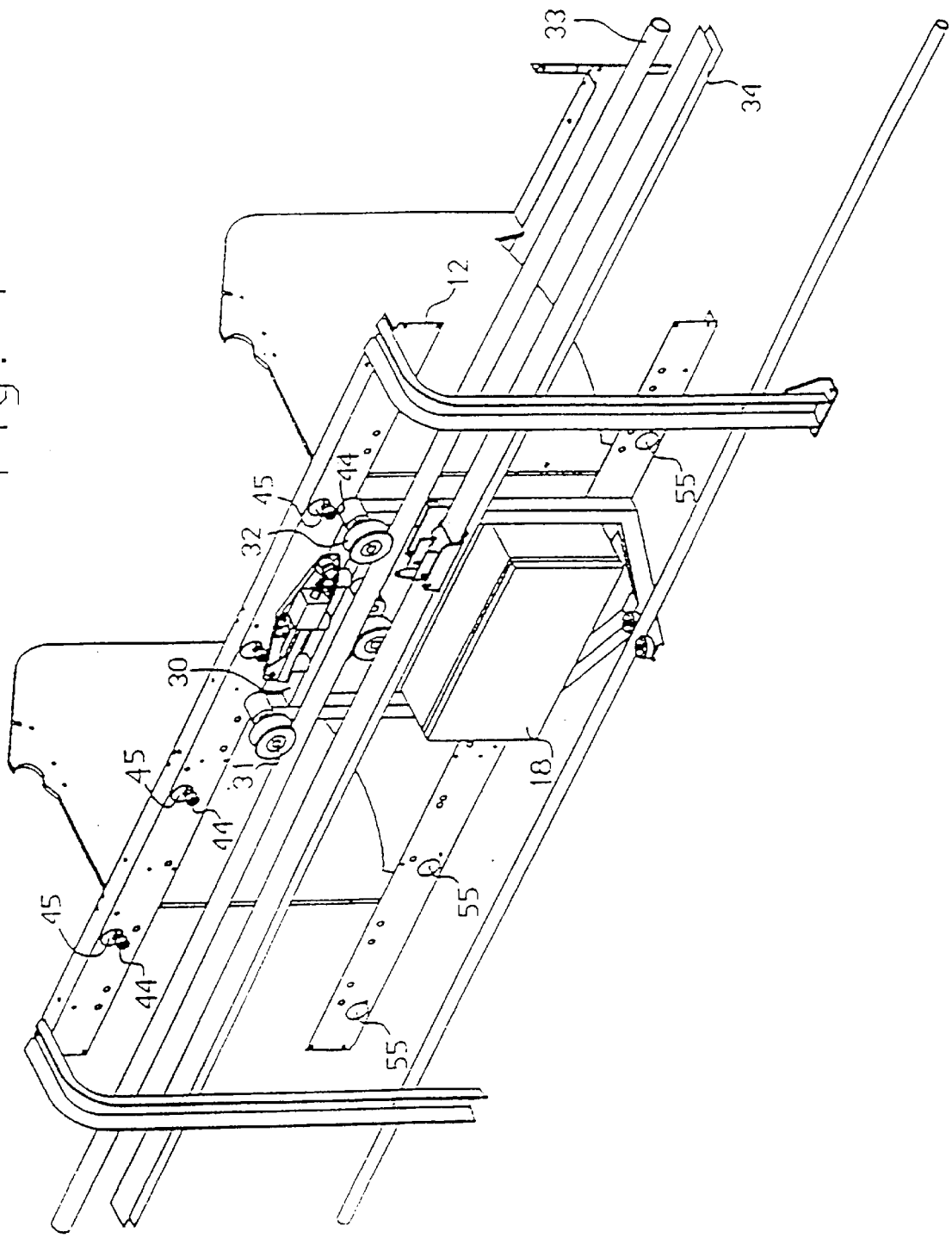
FIG. 4 is a perspective view of another portion of the apparatus from the same side as in FIG. 3.
Figure 5:
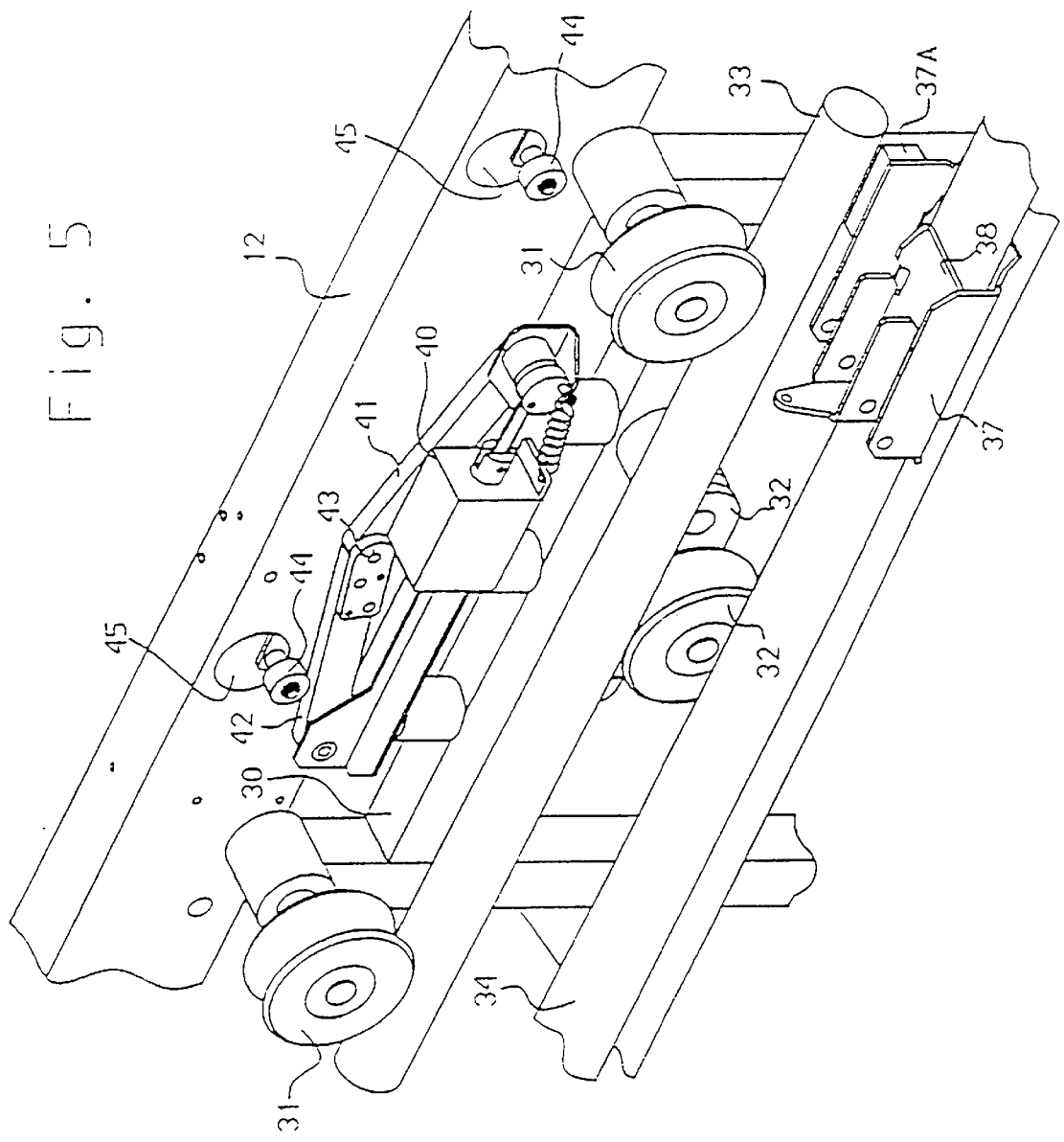
FIG. 5 is an enlarged perspective view of a portion of the Apparatus seen in FIG. 4.

As shown particularly in FIGS. 4 and 5, the common actuator system for all the ejector bars includes a carriage, generally designated 30, supported at its opposite ends by two pairs of upper rollers 31 and a pair of lower rollers 32 movable along opposite sides of a guide rod 33 adjacent to the upper ends of all the cages 2. Carriage 30 is driven by a closed-loop belt 34 rotated by a motor 35 supported at one end of the frame structure 12 (FIG. 3). An encoder 36 provides an electrical indication of the instantaneous position of the carriage.

Figure 6:
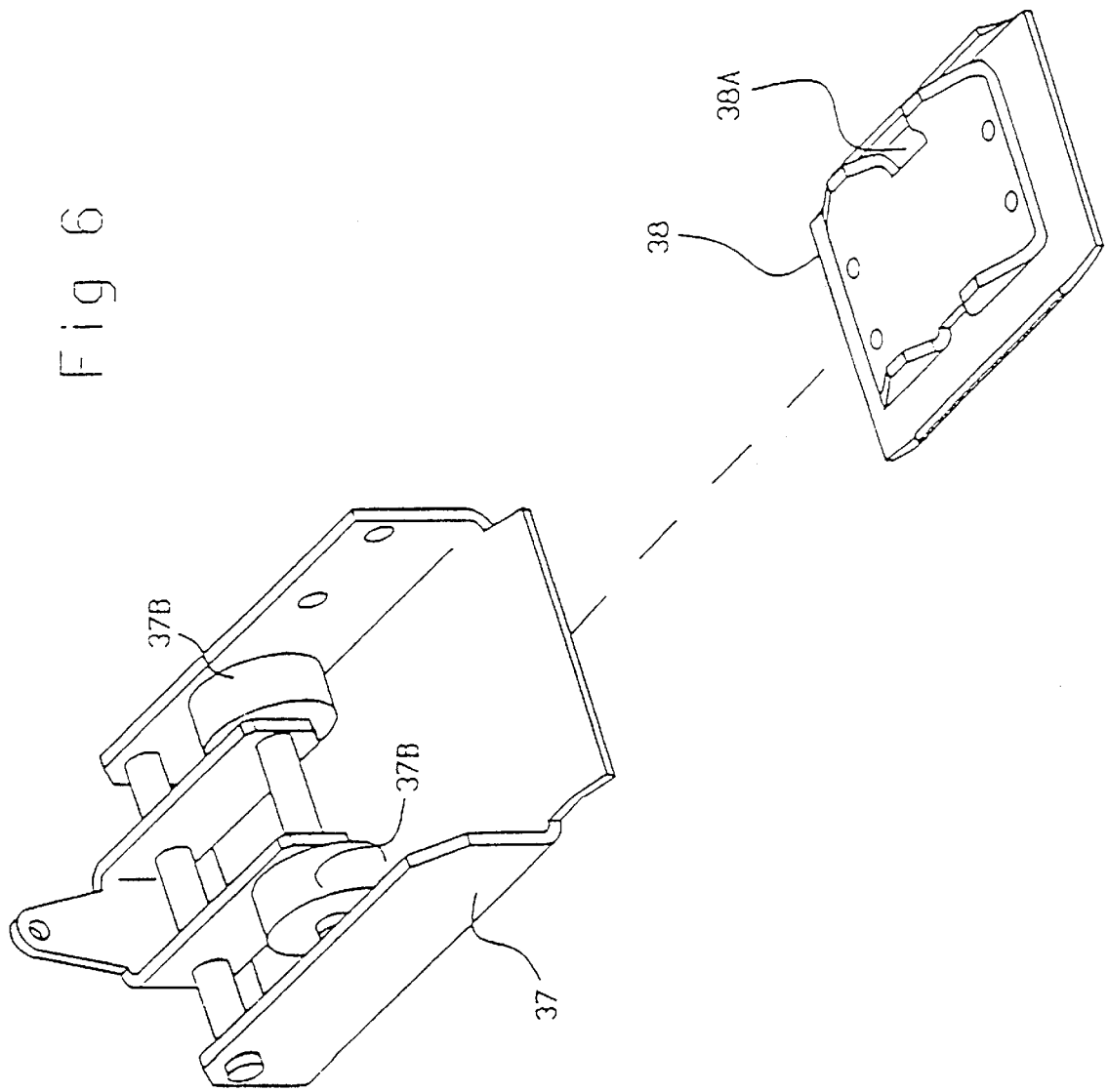
FIG. 6 is an exploded view illustrating a slip-coupling used in the portion of the apparatus shown in FIGS. 4 and 5.
Figure 7:
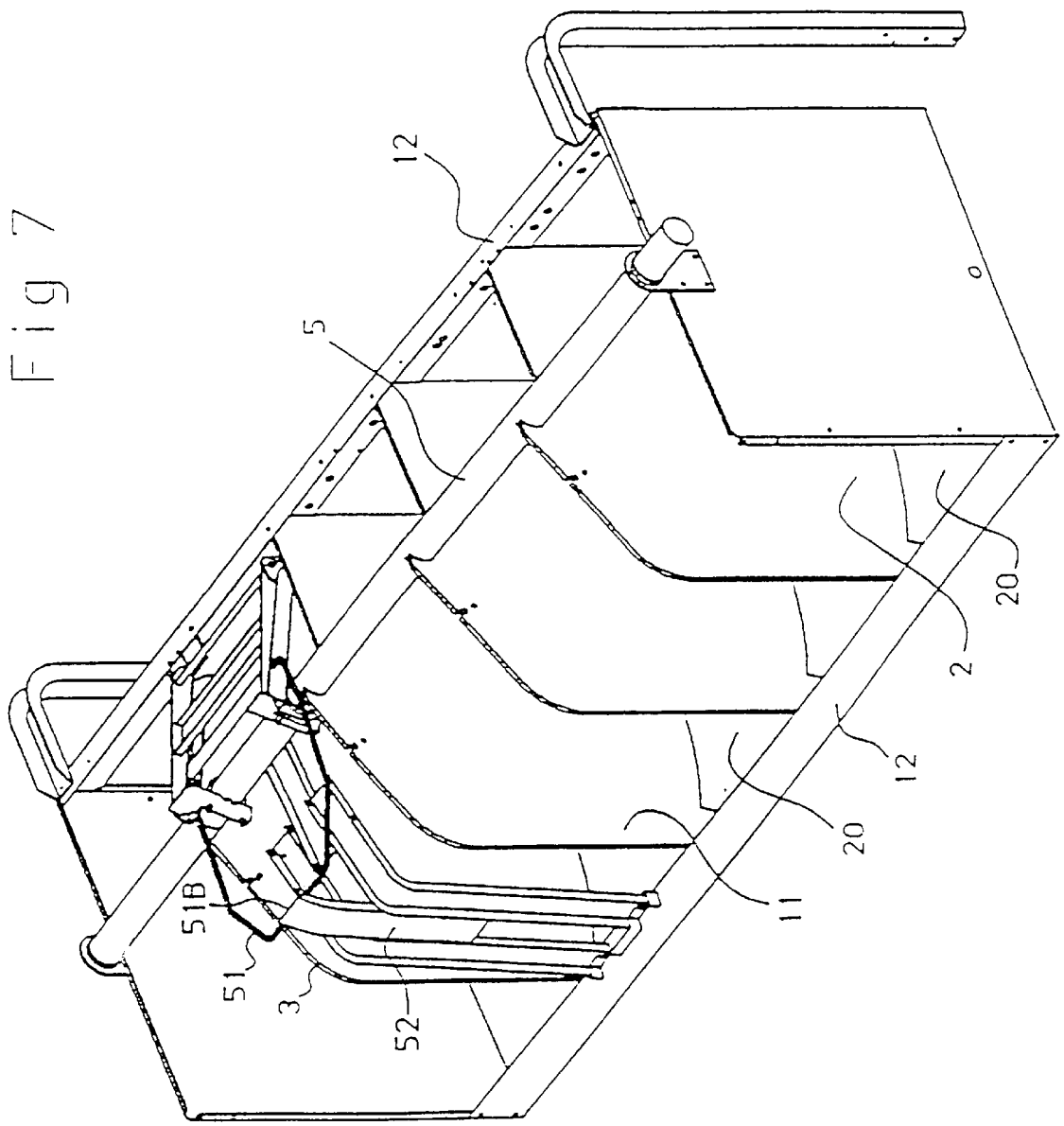
FIG. 7 is a perspective view illustrating a plurality of the cages and particularly the ejector assembly of one of the cages in its non-actuated condition.
Figure 8:
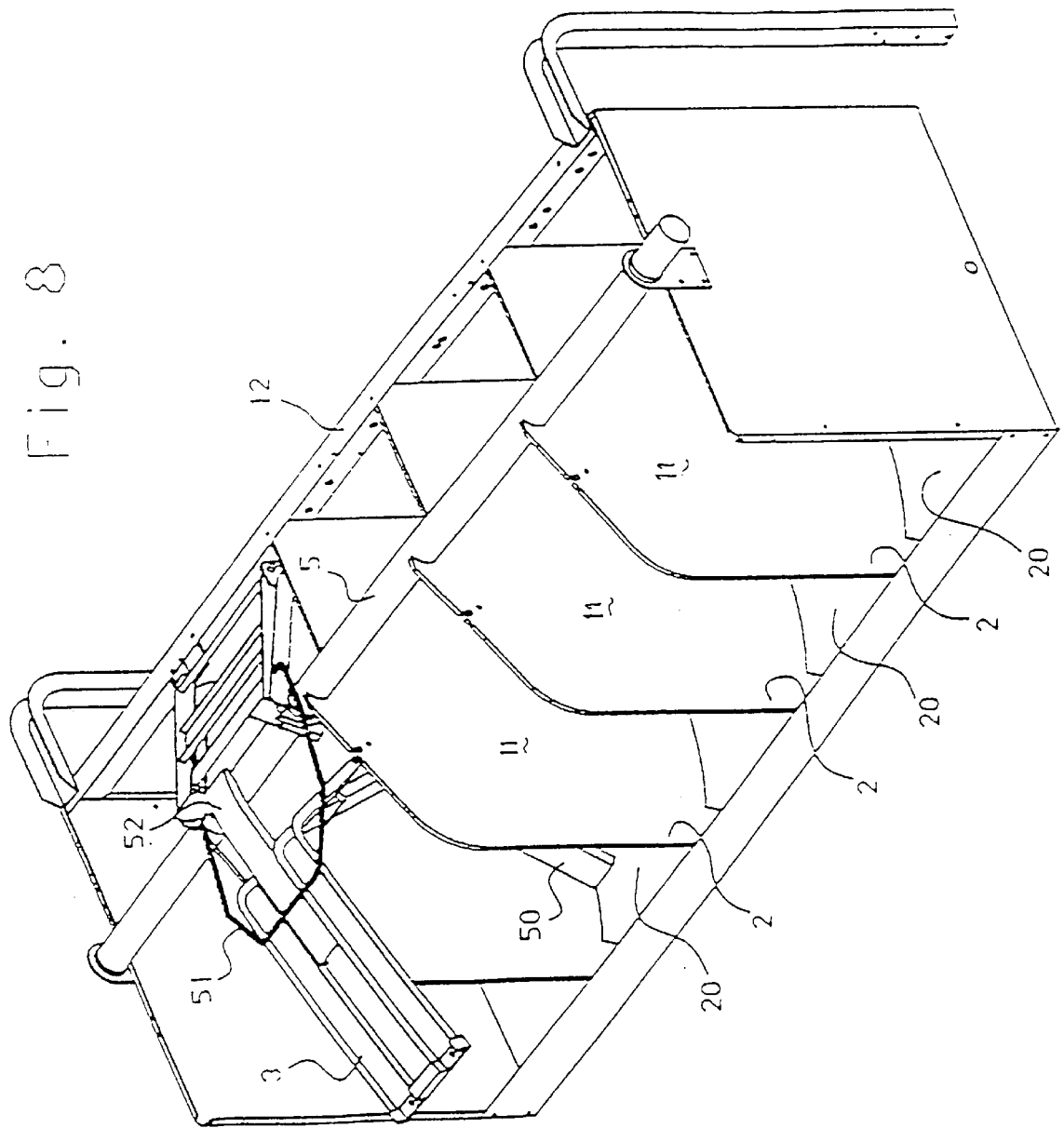
FIG. 8 is a view similar to that of FIG. 6 but showing the ejector assembly in its actuated condition.

Carriage 30 is coupled to the closed-loop belt 34 by a two-part slip-coupling, best seen in FIGS. 5 and 6. One part 37 is secured to the carriage 30, e.g., as shown at 37a in FIG. 5, and includes a pair of rollers 37b receivable within recesses 38a of the second part 38 fixed to the belt 34. Normally, rollers 37b are seated in recess 38a to thereby couple the carriage 30 to the belt 34; however, should movement of the carriage be blocked by an obstacle, rollers 37b will unseat from recesses 38a, to thereby prevent damage to the belt or to motor 35 driving it.

Carriage 30 carries a solenoid 40 which, in this embodiment, is energized by the actuation of one of the egg sensors (switch 23, FIG. 2) when an egg has been laid in a particular cage or when another specified condition with respect to a particular hen has occurred. Solenoid 40 is coupled to one end of a pivotal link 41. The opposite end of link 41 is pivotally coupled to a second link 42 also pivotally mounted to the carriage 30. The two links 41, 42 are pivotally mounted at an angle to each other such that they form an apex at their juncture 43 which is at a relatively low position when solenoid 40 is not energized, but which is moved to a higher position when the solenoid is energized.

The apex 43 between the two links 41, 42 serves as an actuator for actuating the ejector assembly of a particular cage when a hen has laid an egg therein as sensed by the egg sensor switch 23, and/or when another specified condition has occurred. Thus, the ejector assembly of each cage includes a roller 44 projecting through an opening 45 in the apparatus frame 12. Normally, solenoid 40 is not energized, so that the apex 43 between the two links 41, 42 passes under all the rollers 44; however, when solenoid 40 is energized, apex 43 is moved upwardly to engage the next roller 44 which it encounters during its movement by carriage across the line of cages. This actuates the ejector assembly of the respective cage to couple the ejector assembly to drive shaft 5, and thereby to actuate the ejector bar 4 to eject a hen from the respective cage.

The construction of the ejector assembly for each cage is more particularly illustrated in FIG. 9, and its operation is described below with respect to FIGS. 10–13.

Figure 9:
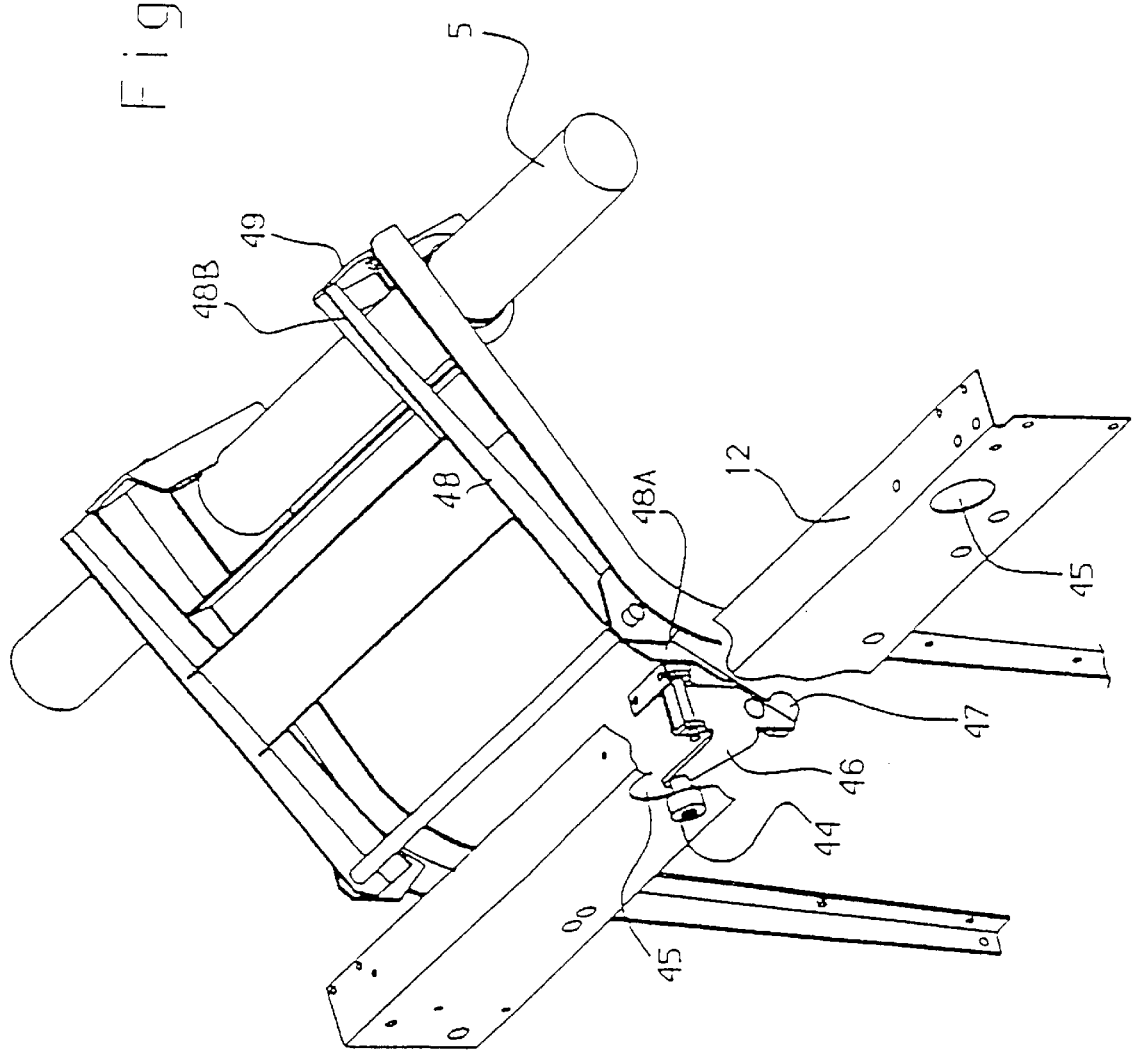
FIG. 9 is a perspective view more particularly illustrating the main elements of the ejector actuator system.
Figure 10:
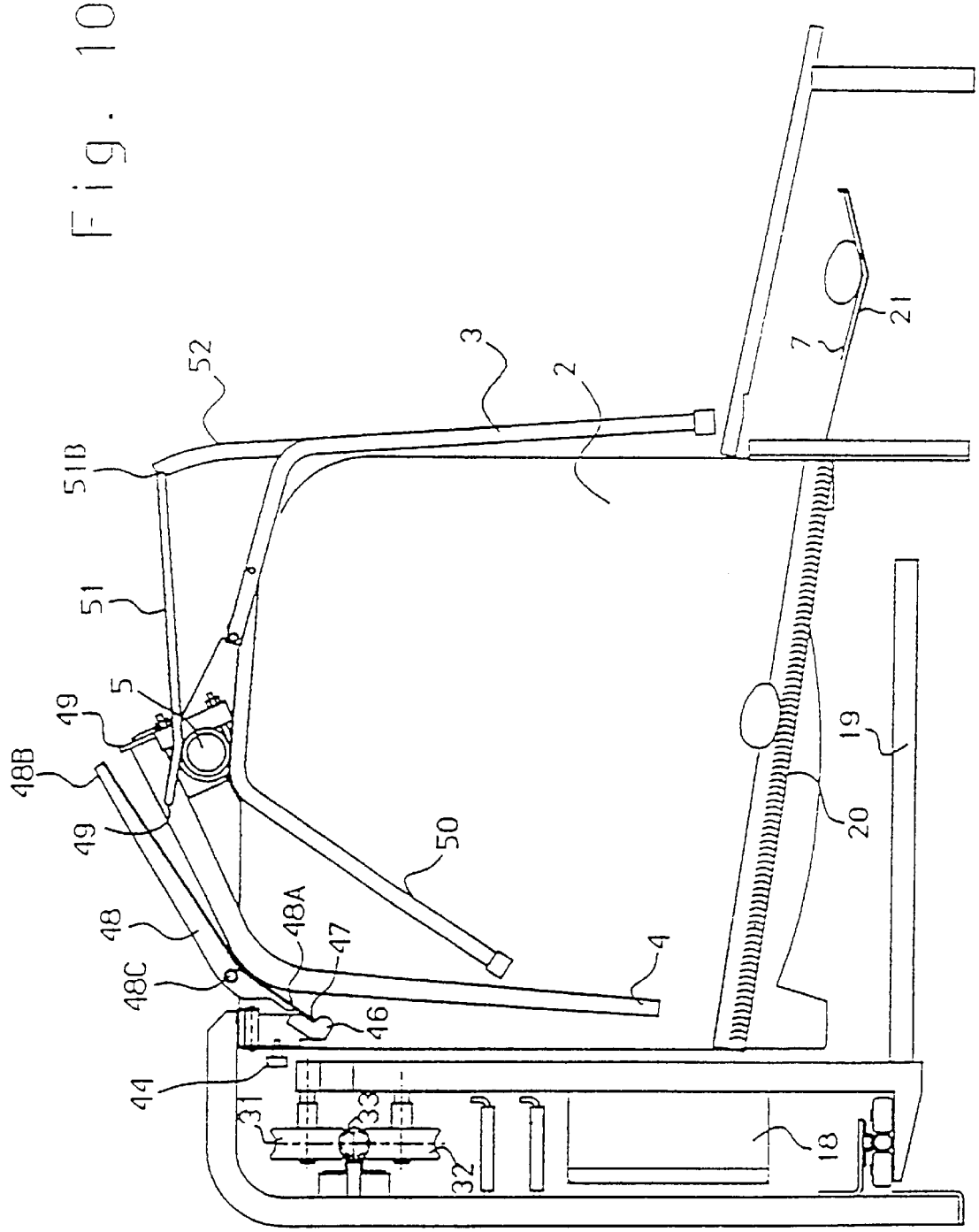

Thus, as shown in particularly in FIGS. 9 and 10, roller 44 is coupled to one end of a lever 46 formed with a shoulder 47. This shoulder normally seats one end 48a of a clutch bar 48 pivotally mounted to the frame such that the opposite end 48b of the clutch bar is normally raised above a clutch segment 49 secured to the drive shaft 5. However, when roller 44 is lifted by the engagement with apex 43 of the two links 41, 42, lever 46 is pivotted to permit clutch bar 48 to pivot (clockwise, FIG. 10), to bring its end 48b into alignment with clutch segment 49 (FIG. 11), and thereby to couple the clutch bar to the drive shaft 5.

Clutch bar 48 is pivotally mounted at 48c to an ejector frame 50 such that when the clutch bar is coupled to drive shaft 5 it pivots the ejector frame. The latter frame pivotally mounts ejector bar 4 and also trap 3. The arrangement is such that when the ejector frame 50 is pivotted in a clockwise direction, as shown in FIGS. 11–13, it moves the ejector bar 4 towards the entrance of the respective cage to eject the hen therefrom and at the same time moves the trap 3 to its open position to thereby permit another hen to enter. During the return movement of drive shaft 5, it returns the ejector bar 4 to its initial position, and the clutch bar 48 is relatched in its normal position with its end 48a seated against shoulder 47 and lever 46, assuming that its roller 44 has returned to its lower position.

The cage from which a hen has been ejected is thus open to enable another hen to enter. When another hen does enter, it closes trap 3 to prevent another hen from entering.

As trap 3 is closed by the entry of a hen into a cage, it may be latched in its closed position to prevent the hen from exiting until the ejector assembly of the respective cage has been actuated. Thus, the ejector assembly of each cage may include a latching member 51, in the form of a bail pivotally mounted to the ejector frame 50 at one end 51a, and cooperable at its opposite end with an extension 52 in trap 3. Thus, as shown particularly in FIGS. 7 and 10, when trap 3 is closed, latching bail 51 engages the upper end of the trap extension 52 to thereby prevent the trap from being opened by the hen; but as soon as the ejector assembly of the respective cage has been actuated, latching bail 51 is pivotted out of engagement with the end of trap extension 52, to permit the trap to be opened at the time the ejector bar 4 is actuated, as shown in FIGS. 12 and 13.

The apparatus frame 12 further includes a second series of openings 55 (FIG. 4) one for each cage 2. These openings are cooperable with an optical detector (not shown) carried by reader 18 for calibrating purposes. Thus, encoder 36, which identifies the position of the carriage 30 with respect to the cages 2, may be pre-calibrated by openings 55 at known locations with respect to each of the cages.

Control Circuit (FIG. 16)

The control circuit included in the apparatus is schematically illustrated in FIG. 16. It includes a microprocessor or controller 60 having a number of inputs, including the following: the input treatment criteria 61, specifying the conditions or other criteria governing the treatment of the hens; the egg sensor switches 23 for all the cages 2; the transponder reader 18, including its antenna 19; encoder 36 to indicate the instantaneous position of the carriage 30; and a timer 62. In response to the foregoing inputs, microprocessor 60 outputs control signals to control the following operations: drive motor 8 for the egg conveyor 7; drive motor 35 for the carriage 30; the piston/cylinder drive 6 for the drive shaft 5; and solenoid 40 carried by carriage 30 for actuating the ejector assembly of a cage in which the laying of an egg has been sensed.

In addition, microprocessor 60 outputs at 63 various types of data for individual hens that may be used for efficiently managing the flock of hens, as will be described more particularly below; this data is therefore returned as an input to the microprocessor.

Overall Operation

The apparatus would be initially conditioned as shown in FIG. 13, wherein the traps 3 for all the cages 2 are in their open positions to permit the entry of a hen in each cage. Whenever a hen enters a cage, it closes trap 3 of the cage. As soon as the cage trap 3 is closed, it is latched in its closed condition by latching bail 51 engaging the end of extension 52 of trap 3 (FIG. 10), thereby preventing the hen from exiting the cage.

The hens may thus freely enter the cages for nesting purposes, but are prevented from exiting from the cage until the ejector assembly of the respective cage has been actuated.

Motor 35 continuously drives carriage 30 back and forth across the line of cages. Normally, solenoid 40 is not energized, so that the actuator apex 43 between links 41, 42 is below the rollers 44 of the ejector assemblies for all the cages, and therefore none of the ejector assemblies is coupled to the drive shaft 5.

Drive shaft 5 is rotated as required, e.g., periodically every ten minutes, first in one direction and then in the opposite direction, by piston-cylinder drive 6. In the initial, normal condition of the ejector assemblies, none of the ejector assemblies is coupled to the drive shaft, and therefore none is actuated by it during the periodic actuations of the drive shaft.

Whenever a hen in a cage lays an egg, the downwardly-inclined bottom wall 20 of the cage causes the egg to move by gravity onto the egg conveyor 7. During this movement of the egg, it engages bail 22 (FIG. 2) for the respective cage, and thereby actuates the egg sensor switch 23 of the respective cage. This information is fed to the controller 60, thereby enabling the controller to identify in which cage an egg has been laid as soon as the egg passes onto the egg conveyor 7.

Controller 60, via the carriage conveyor encoder 36, can also identify the instantaneous position of the carriage 30. As soon as the carriage approaches a cage in which an egg has been laid or when another specified condition with respect to a particular hen has occurred, solenoid 40 of carriage 30 is energized: this raises the apex 43 between the two links 41, 42, to engage roller 44 of the ejector assembly in the respective cage. The engagement of roller 44 by apex 43 of the actuator assembly pivots the roller upwardly to cause lever 46 to release the end 48a of clutch bar 40, and thereby to permit the opposite end 48b of the clutch bar to drop into engagement with clutch segment 49 carried by drive shaft 5, as shown in FIGS. 10 and 11, respectively. The next rotation of the drive shaft 5 will therefore actuate the ejector mechanism for the respective cage. When the ejector mechanism has been so actuated, it pivots latching bail 51 to its releasing position, out of engagement with the end of latching extension 52 of the cage trap 3. It also drives ejector bar 4 towards the entrance to the respective cage, thereby gently ejecting the hen therefrom; and further, it moves the trap 3 to its open position, as seen in FIG. 13, to permit another hen to subsequently enter the cage. The return rotation of drive shaft 5 returns ejector bar 4 to its initial position while the trap 3 remains open.

Modifications Illustrated in FIGS. 17 and 18

FIGS. 17 and 18 illustrate several possible modifications in the apparatus.

According to one modification, the eggs are not removed from the cages by gravity, but rather by an egg-remover plate 100 pivotally mounted at the lower end of ejector bar 4, similar to the construction described in the above-cited U.S. Pat. No. 4,188,911. Accordingly, the egg conveyor belt (7, FIG. 1) is located opposite to the hen entry/exit side of the cage where it is supported by a frame member 102.

Another modification illustrated in FIGS. 17 and 18 is that the movement of an egg from the cage onto the conveyor belt 7 is sensed by a flag 104 which is biassed by a spring 106 to one of two stable positions. Thus, flag 104 is normally in the broken-line position illustrated in FIG. 18, but upon the movement of an egg onto the conveyor belt 7, the flag is moved by the egg to the actuated position shown in full lines in FIG. 18 to thereby provide an indication that an egg has been laid in the cage of the respective hen. This is sensed by an electrical switch sensor 108 (FIG. 17), carried by the carriage 30, which sensor also resets the flag 104 to its normal condition by actuating a solenoid plunger 110 (FIG. 18) to the side of the sensor.

The remainder of the structure in the apparatus illustrated in FIGS. 17 and 18 is substantially the same as described above, and therefore corresponding reference numerals have been used to identify corresponding parts.

Efficient Management of a Flock of Hens

It will thus be seen that the apparatus illustrated in the drawings efficiently uses the nesting cages for producing maximum egg yield by actuating the ejector mechanism of each cage, not periodically at predetermined constant intervals as heretofore, but rather aperiodically when required, e.g., shortly after the hen in a cage has laid an egg.

The illustrated system enables the egg yield from the flock to be even further increased by using the transponder 15 attached to each hen for monitoring the activities of the hens particularly when in the nesting cages. Thus, this transponder permits the egg output of each hen to be monitored since it can identify the hen in each cage where an egg has been laid.

The illustrated apparatus permits even more efficient management of the flock. Thus, if it is determined that a particular hen has laid an egg within a preceding predetermined time interval (e.g., the preceding 24 hours), the chances are that the hen will not then lay another egg even if it entered a nesting cage; and therefore when such a hen has entered a nesting cage, the ejector assembly of the respective cage can be actuated to eject the hen immediately. In addition, if a hen has remained in a cage for a predetermined interval (e.g., 60 minutes) and has not yet laid an egg, the ejector assembly for the respective cage can be actuated, thereby enabling the time allowed for each hen to occupy a cage to be regulated individually.

The illustrated system, particularly the provision of the transponders identifying each hen and the eggs laid by the respective hens, permits data to be gathered for each individual hen or a group of hens to enable more efficient management of the flock as a whole. For example, where the egg output of a particular hen is too low, this may indicate that the daily routine of the hen should be changed, or that the particular hen should not longer be used for egg laying purposes.

While the invention has been described above primarily with respect to one preferred embodiment, it will be appreciated that this is set forth merely for purposes of example, and that many variations may be made. For example, instead of providing an egg sensor for each cage, a single egg sensor may be provided at a predetermined location of the egg conveyor, and an encoder, or other means, may be used for determining the cage from which the egg entered the conveyor. Also, other types of egg sensors could be used, for example optical sensors rather than electrical-switch sensors. Further, the egg-sensor arrangement for autmotically actuating the ejector assemblies could be used without the transponder arrangement for monitoring all activities of the hens, and vice versa.

Further variations, modifications, and applications of the invention will be apparent.

I claim:

1. Nesting apparatus for hens, comprising:

a line of nesting cages;

and an ejector system including an ejector assembly in each cage actuatable to eject a hen therefrom;

said ejector assembly in each cage including an individual actuator enabling the ejector assembly to be individually actuated independently of the ejector assemblies in; the other cages to eject a hen from the respective cage;

said ejector system includes a common drive rotated at preset intervals for all the ejector assemblies;

said individual actuator for each ejector assembly inncludes a coupling between the ejector assembly of the respective cage and the common drive, normally decoupling the ejector assembly from the common drive;

and said ejector system includes a control for actuating said coupling to couple the ejector assembly of the respective cage to said common drive.

2. The apparatus according to claim 1, wherein said common drive comprises:

a drive shaft extending across said line of nesting cages; and a motor actuated to rotate said drive shaft and to thereby actuate all the ejector assemblies coupled thereto.

3. The apparatus according to claim 1, wherein there is an egg sensor for each cage engageable by an egg to actuate the ejector assembly of the respective cage.

4. Nesting apparatus for hens comprising:

a line of nesting cages;

and an ejector system including an ejector assembly in each cage actuatable to eject a hen therefrom;

said ejector assembly in each cage including an individual actuator enabling the ejector assemblies to be individually actuated independently of the ejector assemblies in the other cages to eject a hen from the respective cage;

a carriage movable along a path traversing said nesting cages;

a carriage drive for driving said carriage;

a transponder to be carried by each hen and effective, upon being interrogated by an antenna, to transmit a signal identifying the respective hen;

an antenna carried by said carriage for interrogating the transponders carried by the hens in the cages as the cages are traversed by the carriage;

and a receiver for receiving the identification signals transmitted by the transponders in the traversed cages.

5. The apparatus according to claim 4, wherein said carriage drive includes an encoder for continuously indicating the instantaneous position of the carriage with respect to the cages traversed by the carriage.

6. Nesting apparatus for hens, comprising:

a transponder attachable to each hen effective, upon being interrogated by an antenna, to transmit a signal identifying the respective hen;

a line of nesting cages;

a carriage movable along a path traversing said line of cages;

a carriage drive for driving said carriage;

an encoder for continuously indicating the instantaneous position of the carriage with respect to the cages traversed by the carriage;

an antenna carried by the carriage for interrogating the transponders carried by the hens in the cages as the cages are traversed by the carriage;

and a receiver for receiving the signals from the transponder and for thereby identifying the hens in the cages as traversed by the carriage.

7. The apparatus according to claim 6, wherein said apparatus further comprises:

an egg conveyor along the line of the nesting cages for receiving the eggs laid by the hens in the cages;

a drive for driving said egg conveyor; and an egg sensor for sensing the movement of an egg from a cage onto said egg conveyor.

8. The apparatus according to claim 7, wherein there is an egg sensor for each cage, each egg sensor including an electrical switch and a switch operator engageable by an egg when passing from the respective cage to the egg conveyor.

9. The apparatus according to claim 7, wherein the apparatus further comprises:

an ejector assembly in each cage actuatable to eject a hen therefrom;

and an ejector actuator system including an actuator for each ejector assembly individually actuatable independently of the ejector members in the other cases to eject a hen from the respective cage.

10. The apparatus according to claim 9, wherein said ejector actuator system includes:

a common drive for all the ejector assemblies:

a coupling assembly between the ejector assembly of each cage and the common drive, normally decoupling the ejector assembly from the common drive;

and a control for actuating said coupling assembly to couple the ejector assembly of the cage to said common drive.

11. The apparatus according to claim 10, wherein said common drive comprises:

a drive shaft extending across said line of nesting cages; and a motor actuated to rotate said drive shaft and to thereby actuate all the ejector assemblies coupled thereto.

12. A method of controlling a flock of hens, comprising:

providing the flock of hens with a line of nesting cages each including an ejector assembly actuatable to eject a hen therefrom;

sensing the occurrence of a specified condition with respect to individual hens;

said specified condition includes the sensing of the laying of an egg by the hen in the respective cage;

and controlling the ejector assembly of a nesting cage occupied by a hen in response to sensing the occurrence of the specified condition with respect to the respective hen.

13. A method of controlling a flock of hens, comprising:

providing the flock of hens with a line of nesting cages each including an ejector assembly actuatable to eject a hen therefrom;

sensing the occurrence of a specified condition with respect to individual hens;

and controlling the ejector assembly of a nesting cage occupied by a hen in response to sensing the occurrence of the specified condition with respect to the respective hen;

wherein the ejector assemblies are actuated by a common drive, said ejector assemblies being normally uncoupled to said common drive but being coupled thereto upon the sensing of the specified condition with respect to the hen in the respective cage.

14. A method of controlling a flock of hens, comprising:

providing the flock of hens with a line of nesting cages each including an ejector assembly actuatable to eject a hen therefrom;

sensing the occurrence of a specified condition with respect to individual hens;

controlling the ejector assembly of a nesting cage occupied by a hen in response to sensing the occurrence of the specified condition with respect to the respective hen;

attaching to each hen a transponder effective, upon being interrogated, to transmit a signal identifying the respective hen;

moving an antenna along the line of nesting cages for interrogating the transponders carried by the hens in the cages;

receiving identification signals from the transponders as they are interrogated by the antenna;

determining the instantaneous position of an antenna at the time a signal is received from an interrogated transponder, to thereby identify the hen in each cage occupied by a hen;

and upon determining that a hen in a particular cage has already laid an egg in one of the cages within a predetermined time period, actuating said ejector assembly to eject the hen from the respective cage.

15. A method of controlling of a flock of hens, comprising:

moving an antenna along a line of the nesting cages for interrogating the transponders carried by the hens in the cages;

receiving identification signals from the transponders as they are interrogated by the antenna; and determining the instantaneous position of an antenna at the time a signal is received from an interrogated transponder to thereby identify the hen in each cage occupied by a hen.

16. The method according to claim 15, wherein the instantaneous position of the antenna at the time a signal is received from an interrogator transponder is determined by an encoder coupled to a drive moving the antenna along the line of nesting cages.

17. The method according to claim 15, wherein the laying of an egg by a hen in a cage is sensed, and an ejector mechanism is actuated in response thereto for ejecting the hen from the respective cage.

\* \* \* \* \*